May 11, 1937. R. W. BURNETT 2,079,984

HAND BRAKE

Original Filed Jan. 13, 1927 4 Sheets-Sheet 1

Inventor
Richard W. Burnett
By Barnett & Truman
Attorneys

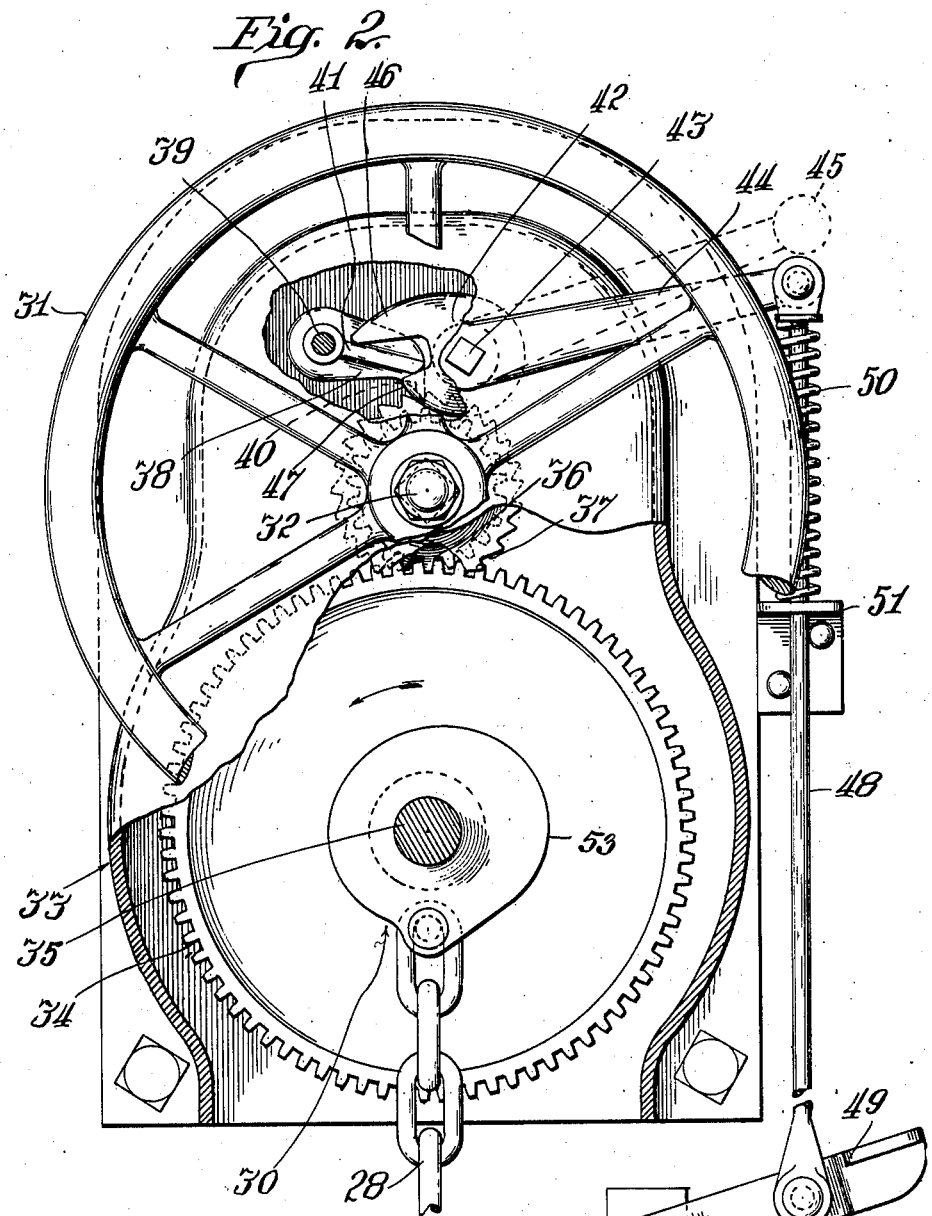

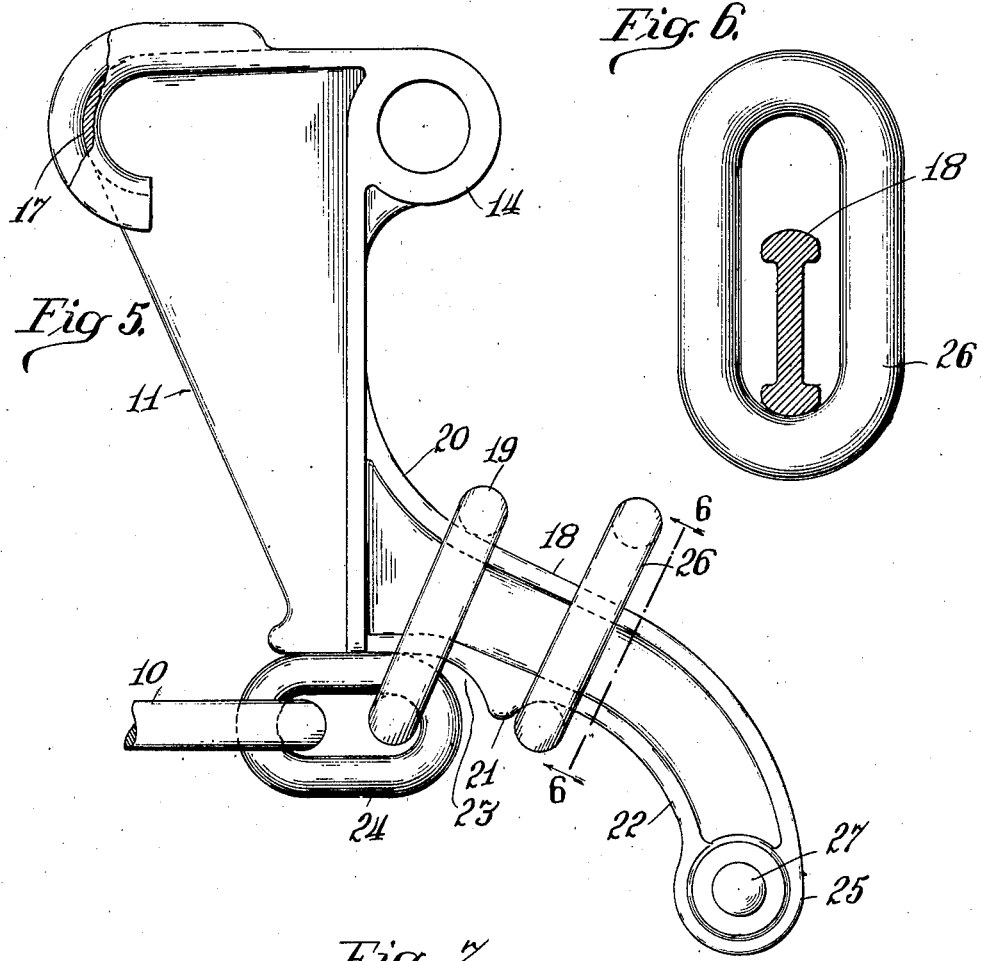
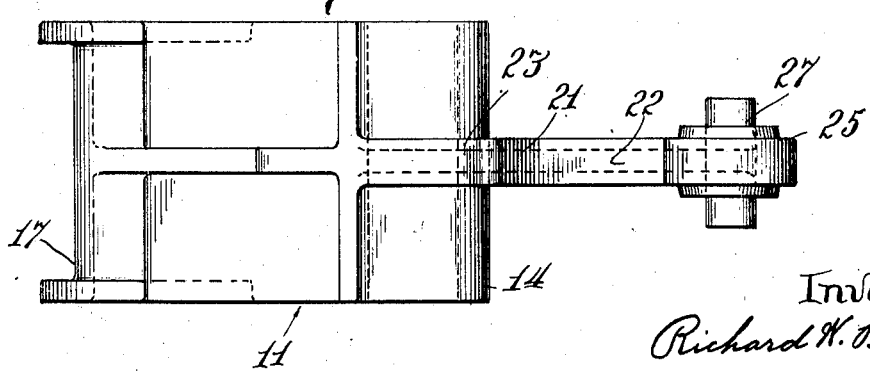

May 11, 1937.  R. W. BURNETT  2,079,984
HAND BRAKE
Original Filed Jan. 13, 1927  4 Sheets-Sheet 4
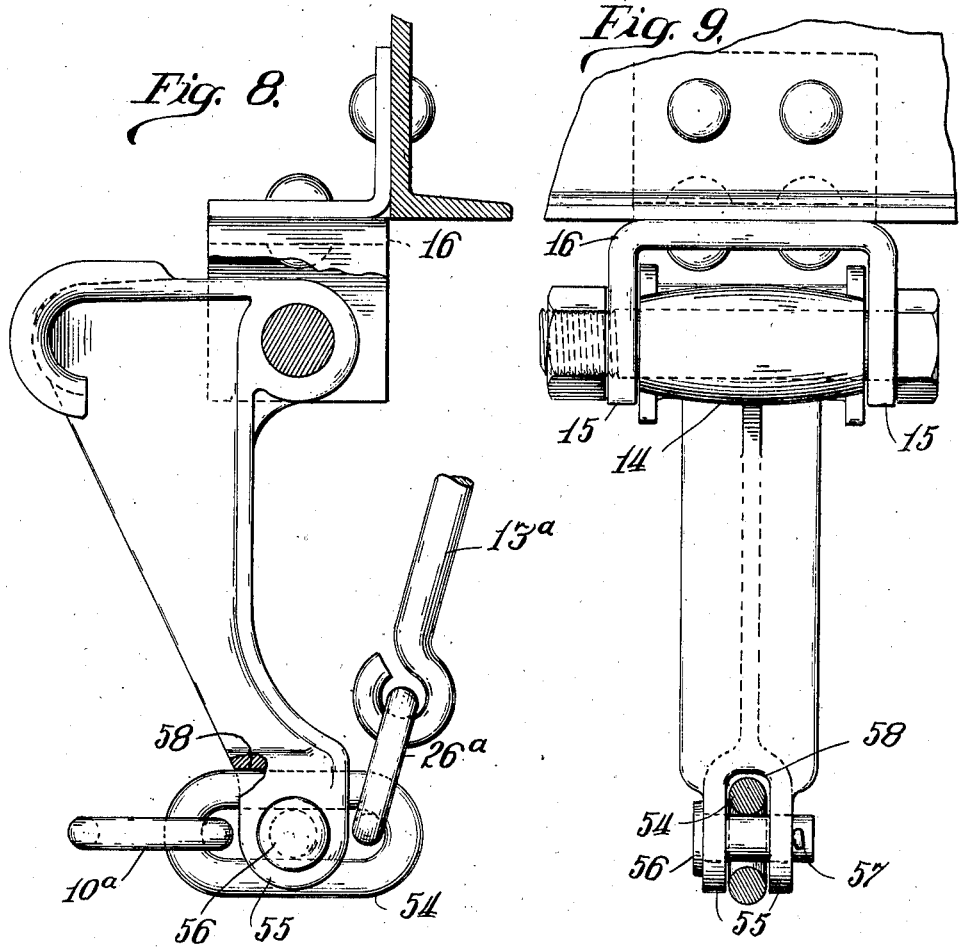
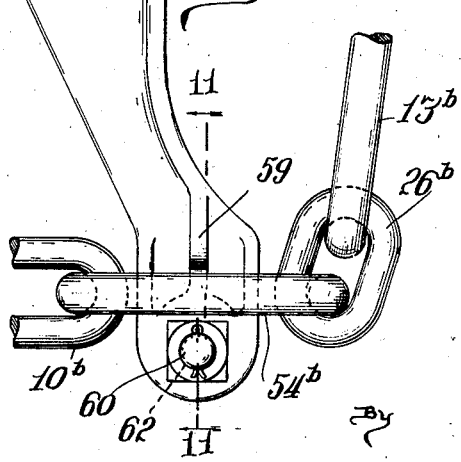
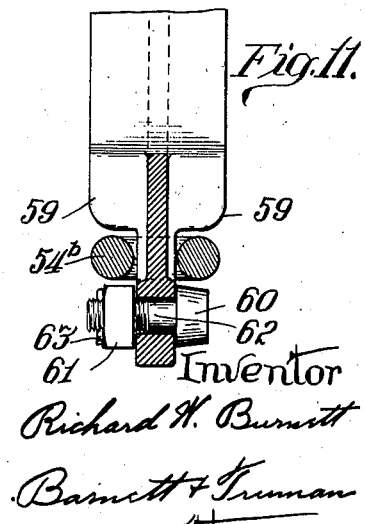

Patented May 11, 1937

2,079,984

UNITED STATES PATENT OFFICE 2,079,984

HAND BRAKE

Richard W. Burnett, Chicago, Ill.

Application January 13, 1927, Serial No. 160,870
Renewed August 24, 1934

10 Claims. (Cl. 74—516)

My invention relates to manually operated means for setting the brakes of railway cars, and is concerned more particularly in providing certain improvements in the hand brake mechanism disclosed in my application, Serial No. 109,061, filed May 14, 1926, issued into U. S. Letters Patent No. 2,054,651 on September 15, 1936.

The object of the invention is to provide improvements in the connections between the hand operated mechanism and the foundation brake rigging of the car and particularly to the provision of improvements in the construction and operation of the bellcrank or rocking member employed for transmitting the vertical force exerted by the hand operated mechanism to the brake rigging underneath the car, whereby the said rocking member will so cooperate with the power mechanism and the means connecting the same with the brake rigging as to take care of a wide range of slack in the brake rigging and so as to effect the desired application of power when the brake shoes have been moved into operative contact with the car wheels.

Another object of the invention is to simplify and strengthen certain parts of the mechanism so as to facilitate their installation on railway cars of various types and to reduce the cost of manufacture of a hand brake.

The invention is illustrated in certain preferred embodiments in the accompanying drawings, wherein:

Fig. 2 is a front view partly in section and partly in elevation, of a winding mechanism shown in Fig. 1.

Fig. 5 is an enlarged detail view of the bellcrank shown in Figs. 1, 3 and 4.

Fig. 6 is a cross section taken on line 6—6 of Fig. 5.

Fig. 7 is an end view of the bellcrank shown in Fig. 5.

Fig. 8 is a side view of a modified form of bellcrank.

Fig. 9 is an edge view in elevation of the modification shown in Fig. 8.

Fig. 10 is a further modification of the lower end of the bellcrank shown in either of the preceding embodiments, and Fig. 11 is a cross sectional view taken on line 11—11 of Fig. 10.

Referring first to Figs. 1 to 7 inclusive, wherein I have illustrated one embodiment of the invention applied to the blind end of a railway baggage car. The embodiment shown in these figures consists generally of a flexible connector 10, one end of which is connected to the hand brake pull rod (not shown) of the brake rigging underneath the car, this rigging including the usual brake shoes, brake beams, equalizing bars and air cylinders for setting the brakes. The term "brake rigging" is used hereinafter in the specification and claims, in this sense. The other end of the flexible member is connected to a bellcrank 11, which in turn is connected to the hand operated power means by a substantially vertically disposed flexible connector 13.

Figure 1:
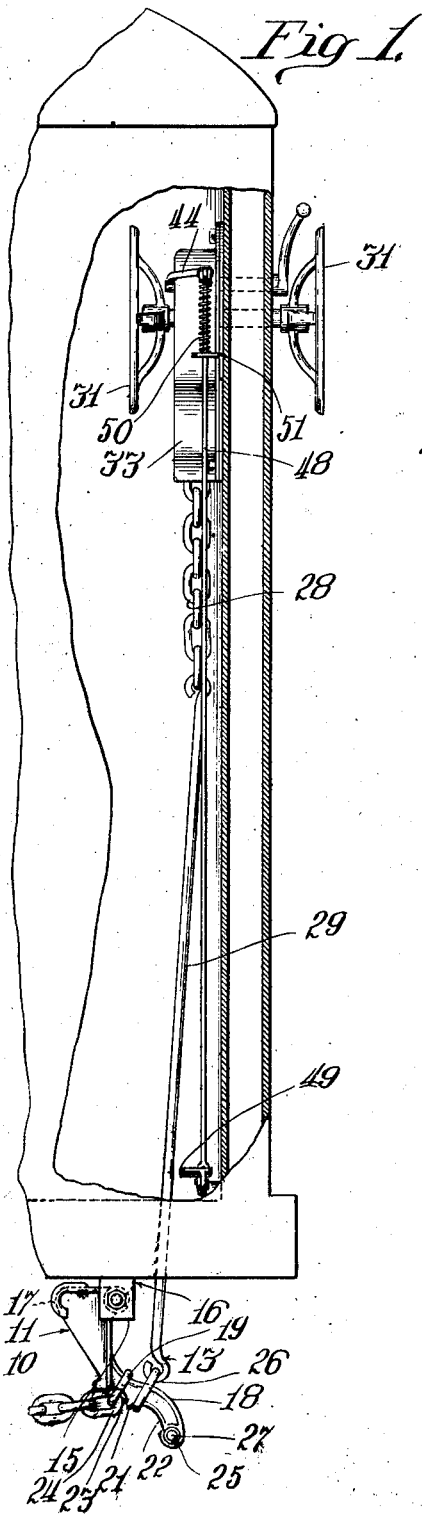
Fig. 1 is a hand brake constructed in accordance with my invention applied to the blind end of a railway baggage car.
Figure 4:
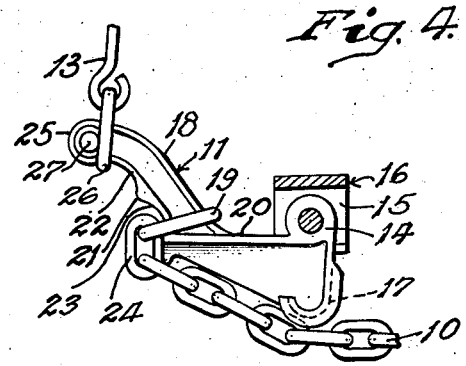
Fig. 4 is a view similar to Fig. 3 but showing the bellcrank in its extreme brake setting position.
Figure 3:
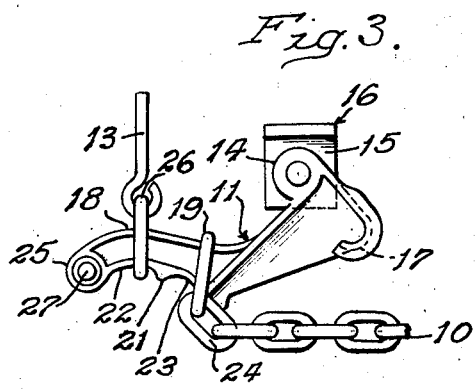
Fig. 3 is a view showing the position of the bellcrank member when the slack in the brake rigging is removed.

The bellcrank 11 is formed with a relatively wide hub portion 14 and is pivoted between the downturned end portions 15 of an inverted U-shaped bracket 16 secured to the under framing of the car near the end thereof. The body portion of the bellcrank normally hangs in a substantially vertical position as shown in Fig. 1 and is formed at the upper end with a channel-shaped winding portion 17 about which the chain 10 is wound during the brake-setting operation. The lower end of the body is provided with a downwardly and outwardly curved arm 18 which extends through the end link 19 of the connector 10. The arm 18 is preferably I-shaped in cross section so as to provide the desired strength and is curved upwardly toward the body as indicated by the reference character 20 so as to limit the movements of the link 19. A transverse rib 21 is formed on the under surface of the arm 18 so as to divide this portion of the arm into a relatively long curved portion 22 and a curved pocket 23 the latter of which is adapted to receive the link 24 of the connector 10. The link 19 of the connector is of such size that it may be slipped over the outer end 25 of the arm and over the transverse web 21 to the operating position shown in Fig. 5. The curved portion 22 of the arm receives a link 26 secured to the lower end of the connector 13. This link is of such size that it may be slipped over the end of the arm and has a sliding engagement with the portion 22 of the arm. A pin 27 extends through the outer end of the arm 18 so as to prevent disengagement of the link 26. The link 26 normally assumes a position adjacent the transverse web 21 when the brakes are in their released position, but normally slides outwardly toward the end of the arm during the brake setting operation. That is to say, after the slack has been removed from the brake rigging and the various connectors, and power is being applied through the brake shoes to the car wheels, the link 26 moves gradually outward toward the end of the arm.

The connector 13 preferably consists of a chain 28, a rod 29, and the link 26. The upper end of the rod 29 is connected to the chain 28 and the upper end of the chain 28 is attached to a winding drum 30 of the hand power mechanism. The said vertical connector 13 is wound upon the channelled winding drum 30 and thereby rocks the bell-crank from the position shown in Fig. 1 to the position indicated in Fig. 3, to take up the slack in the brake rigging, and by a further winding movement rocks the bellcrank from the position shown in Fig. 3 toward the extreme position shown in Fig. 4, so as to set the brakes.

The winding drum is rotated by means of a vertically disposed hand wheel 31 secured to a horizontally disposed power shaft 32. The shaft extends through the end wall and is mounted in suitable journals in a mechanism casing 33, secured to the inside face of the car end wall. The said casing encloses power-multiplying gears consisting preferably of a large gear 34 made integral or otherwise suitably secured to the winding drum 30 and rotatably mounted on a horizontally disposed shaft 35. This gear meshes with a small gear 36 attached rigidly to the power shaft 32 so that rotation of the hand wheel will impart a rotary movement to the large gear and the winding drum.

In the embodiment illustrated in Fig. 1, a hand wheel 31 is secured to each end of the power shaft 32 so that the power mechanism for setting the brakes may be operated from the outside or the inside of the car as may be desired.

The winding mechanism is releasably held against reverse movement by a ratchet mechanism consisting of a ratchet wheel 37 formed integrally with the gear 36, and a pawl or dog 38. The pawl is pivoted at 39 in a position so that the toothed end 40 thereof will drop into engagement with the teeth of the ratchet wheel. The pawl is formed on one side with a web 41 adapted to be engaged by a rocking jaw member 42 secured to a horizontally disposed rocking shaft 43. The shaft 43 is positioned near the end of the pawl 38 and is formed at its opposite end with squared portions, to which are connected levers 44—45, the latter of which is disposed inside the car so that the brakes may be released from the inside of the car when desired. The jaw member 42 is formed with a long jaw 46 and a short jaw 47, which together embrace the web 41 of the pawl. The long jaw bears against the upper surface of the web 41 at a point near the pivotal axis of the pawl. With this arrangement the movement of the pawl as it rides over the ratchet teeth will not produce any appreciable movement of the outer end of the levers 44—45. The short jaw 47 engages the under surface of the web 41 at the end of the web and relatively close to the pivotal axis of the jaw member, so as to provide maximum pressure against the under surface of the web when it is desired to release the pawl. The outer end of the lever 44 is connected through a rod 48 to a foot lever 49, the latter of which is pivotally supported on the car floor. The upper end of the rod 48 is provided with a removable clevis, so that the rod may extend through a coiled spring 50, positioned between the outer end of the lever 44 and a bracket 51 secured to the end wall of the car. The spring 50 holds the levers 44—45 and the jaw member 42 in a position so that the long jaw 46 is pressed with spring pressure against the upper surface of the web 41, so as to hold the pawl 38 in engagement with the ratchet teeth. A similar foot lever and connecting rod may be positioned on the outside of the car and attached to the lever 45 if such arrangement should be desired. The amount of slack to be taken up in the brake rigging of railway cars varies considerably in different cars. It is desirable, therefore, that the winding mechanism and the bell crank be so constructed as to cooperate with each other to take care of the wide variations in the slack to be taken up. It is also desirable to bring the brake shoes into contact with the wheels of the car and apply braking pressure thereto with a minimum of effort on the part of the brakeman. With this view in mind, I have provided the winding drum with an eccentric configuration, and have attached the chain 28 to the drum so that the chain will wrap about the surface of minimum radius during the initial rotation of the drum. The maximum power of the drum is therefore exerted while the pivoted member 11 is at or near its lowest position. The minimum radius of the drum extends, preferably, over approximately 180° of the drum so that the maximum power of the drum will continue until the brake shoes come into contact with the car wheels. For the great majority of cars in service the shoes will come into contact with the car wheels at from five to eight inches of travel of the hand brake rod. Under such conditions, the portion of minimum radius of the drum will be more than sufficient to set the brakes of the average car now in service. The above range of take up is effected by movement of the bell crank from the position shown in Fig. 1 to the position shown in Fig. 3. The continued upward movement of the bell crank moves the chain 10 nearer the pivotal axis of the bell crank and therefore increases the effective power of the bell crank during the brake setting operation and until the chain 10 begins to wrap about the surface 17 of the bell crank. The bell crank is designed, however, so that the chain 10 will begin to wrap about the surface 17 when the arm 18 has raised to such point that the link 26 begins to slide outwardly toward the end of the arm. At this point of operation, the chain 28 begins to wrap about the drum surface 53 of increasing radius and thereby decreases the effective power of the drum. This decrease in power of the drum is offset, however, by the increase in power effected by the sliding of the connector link 26 outwardly toward the end of the bell crank arm 28.

In Figs. 8 and 9 I have shown a modified form of bell crank in which the lower end of the crank is provided with a clevis end instead of the curved arm shown in the preceding figures. In this modification the link 26ᵃ of the vertical connector 13ᵃ is connected with a link 54 which is slidably fitted in the clevis 55 of the bell crank arm. The link 54 is held in position in the clevis by means of a clevis pin 56 which may be held in place by any suitable means, for example, by a cotter pin 57. One side of the link 54 bears against and has sliding contact with the throat 58 of the clevis, so that the connector may move relative to the arm of the bellcrank when the bellcrank is at or near its lower position. The amount of such movement will depend on the length of the link 54 and the amount of slack in the connector. In other respects, the bell crank here shown may be, and preferably is, the same in construction as that shown and described in connection with Figs. 1 to 7 inclusive.

In Figs. 10 and 11 I have shown another modified form of bellcrank in which the lower end of the bell crank instead of being provided with a clevis, as shown in Fig. 8, extends through the link 54ᵇ. The said link has a sliding connection and also a pivotal connection with the end of the bell crank. The link 54ᵇ is held in position by means of webs 59—59, and the bolt head 60 and nut 61 of the bolt 62. The nut 61 may be secured against backing off the bolt, in any suitable or approved manner, for example, by the use of a cotter pin 63. The link 54ᵇ, it will be noted, is connected at one end with the link 26ᵇ of the vertical connector and is connected at the other end with the horizontal connector 10ᵇ.

I claim:

1. In combination with the brake rigging of a railway car, a lever pivoted to the car, a horizontally disposed connector attached at one end to the brake rigging and provided at the other end with a link adapted to be slipped over the free end of said lever into operative position thereon, a power means secured to the car, a connector attached at one end to said power means and provided at the other end with a link adapted to be slipped over the free end of said pivoted lever into operative position thereon.

2. In combination with the brake rigging of a railway car, a lever pivoted to the car and formed with a curved portion, a horizontally disposed connector attached at one end to the brake rigging and provided at the other end with a link adapted to be slipped over the free end of said lever into operative position thereon, a power means secured to the car, a connector attached at one end to said power means and provided at the other end with a link adapted to be slipped over the free end of said pivoted lever into operative position on the curved portion thereof; the last mentioned link being adapted to move outwardly toward the end of the lever to increase the power during the application of power to the brakes.

3. In combination with the brake rigging of a railway car, a lever pivoted to the car, a horizontally disposed connector attached at one end to the brake rigging and provided at the other end with a link adapted to be slipped over the free end of said lever into operative position thereon, a power means secured to the car, a connector attached at one end to said power means and provided at the other end with a link adapted to be slipped over the free end of said pivoted lever into operative position thereon; the slack in said connectors being normally such as to prevent substantial displacement of the first mentioned connector on said lever when the brakes are in their released position.

4. In combination with the brake rigging of a railway car, a lever pivoted to the car, a horizontally disposed connector attached at one end to the brake rigging and provided at the other end with a link adapted to be slipped over the free end of said lever into operative position thereon, a power means secured to the car, a connector attached at one end to said power means and provided at the other end with a link adapted to be slipped over the free end of said pivoted lever into operative position thereon; the slack in said connectors being normally such as to prevent disconnection of either of said connectors from said pivoted lever when the brakes are in their released position.

5. In combination with a brake rigging of a railway car, winding means secured to the car, a continuous connector comprising a chain section for connecting said power means with said brake rigging, a portion of said chain section being adapted to move in a substantially vertical position and another portion being adapted to move in a substantially horizontal position, and means for translating the power from the vertically movable portion to the horizontally movable portion of said connector comprising a lever pivoted to the car and having a downwardly extending arm adapted to extend through one link of said chain section.

6. In combination with the brake rigging of a railway car, power means secured to the end wall of the car, a chain section for connecting said power means with the brake rigging, and a lever pivoted to the car and having a downwardly extending arm formed with a bifurcated portion adapted to receive one link of said chain section therein with capacity for sliding movement of said link.

7. In a brake mechanism of the character described, the combination with a winding member and unitary flexible means having portions adapted to extend at angles to each other; and a swingable device adapted to cooperate with said flexible means adjacent the transition of the angular portions one into the other, said device having elements automatically engageable and disengageable with reference to said flexible means depending upon the tension therein.

8. In a hand brake of the character described, the combination with a winding mechanism and a unitary brake chain having portions adapted to extend at angles to each other; a swingable device adapted to cooperate with said chain adjacent the transition of the angular portions one into the other, said device having means for effecting movement of the same in unison with said chain during one phase of operation, and permitting relative movement of said chain with reference to said device during another phase of operation.

9. In a hand brake for a railway car, the combination with winding means; of a unitary flexible element cooperating with said winding means and having an angular portion extending beneath the car; and a device movably connected with said car and engaging said flexible element, said device having means for automatically adjusting its position with reference to said flexible element, to compensate for variations in the length thereof.

10. In a hand brake of the character described, the combination with a winding mechanism and a unitary brake chain having portions adapted to extend at angles to each other; a member movable about a fixed pivot and provided with a guide for said chain and an abutment, said chain being engageable with said abutment upon increase in tension therein and being detachable with respect to said abutment when said tension is decreased.

RICHARD W. BURNETT.